(12) United States Patent
DeLan

(10) Patent No.: US 7,143,239 B2
(45) Date of Patent: Nov. 28, 2006

(54) CACHE STRUCTURE AND METHODOLOGY

(75) Inventor: Eric DeLan, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 282 days.

(21) Appl. No.: 10/636,842

(22) Filed: Aug. 7, 2003

(65) Prior Publication Data

US 2005/0033920 A1 Feb. 10, 2005

(51) Int. Cl.
*G06F 12/06* (2006.01)
(52) U.S. Cl. ............. 711/128; 711/144; 711/145; 711/3; 365/49
(58) Field of Classification Search ........... 711/120, 711/122
See application file for complete search history.

(56) References Cited

U.S. PATENT DOCUMENTS

| | | | |
|---|---|---|---|
| 5,603,004 A * | 2/1997 | Kurpanek et al. | 711/118 |
| 5,822,755 A | 10/1998 | Shippy | |
| 6,237,064 B1* | 5/2001 | Kumar et al. | 711/122 |
| 6,272,597 B1* | 8/2001 | Fu et al. | 711/131 |
| 6,427,188 B1 | 7/2002 | Lyon et al. | |
| 6,532,521 B1* | 3/2003 | Arimilli et al. | 711/137 |
| 6,591,341 B1* | 7/2003 | Sharma | 711/122 |
| 2003/0131184 A1 | 7/2003 | Kever | |

* cited by examiner

*Primary Examiner*—B. James Peikari

(57) ABSTRACT

A cache structure comprising a plurality of tag arrays and a plurality of data arrays, the tag arrays each configured to point to lines of data in multiple ones of the plurality of data arrays, wherein multiple tag arrays are searched in parallel for data that may be contained in the data arrays.

16 Claims, 4 Drawing Sheets

US 7,143,239 B2

CACHE STRUCTURE AND METHODOLOGY

FIELD OF THE INVENTION

The present invention relates generally to processing systems and, more particularly, to cache structure in processing systems.

BACKGROUND OF THE INVENTION

Processing system processors typically utilize cache memories for fast access to data stored in a main memory. When such a processor requests data from the main memory, the requested data is delivered to a cache memory and then delivered to the processor from the cache memory. When the processor issues a subsequent request for the same data, the processing system first checks cache memory. If the requested data resides in cache, a cache "hit" occurs, and the data is delivered to the processor from the cache. If the data is not resident in cache, a cache "miss" occurs, and the data is retrieved from main memory. Frequently utilized data thus tends to be retrieved more rapidly than less frequently requested data. Storage of frequently used data in cache tends to reduce overall data access latency, i.e. time between a processor request for data and delivery of the data to the processor.

Processing system designers have used the concept of cache hierarchy to enhance system performance over a wide variety of applications. A cache hierarchy typically includes a fast but small primary cache at the lowest level of the hierarchy. Upper-level caches typically are used to hold data accessed less frequently than data kept in the primary cache. Thus levels of cache generally are arranged in order of decreasing speed and increasing size. When a cache miss occurs at the primary cache level, the processing system checks the upper cache level(s) for the requested data before accessing the data from main memory. Levels of a cache hierarchy typically are searched in a fixed sequence, from lowest to highest. Although searches for data that can be satisfied out of primary cache generate relatively minimal latencies, latency is increased as each level is searched in its turn.

BRIEF DESCRIPTION OF THE DRAWINGS

The present invention will become more fully understood from the detailed description and the accompanying drawings, wherein.

DETAILED DESCRIPTION OF THE INVENTION

The following description of embodiments of the present invention is merely exemplary in nature and is in no way intended to limit the invention, its application, or uses.

Figure 1:
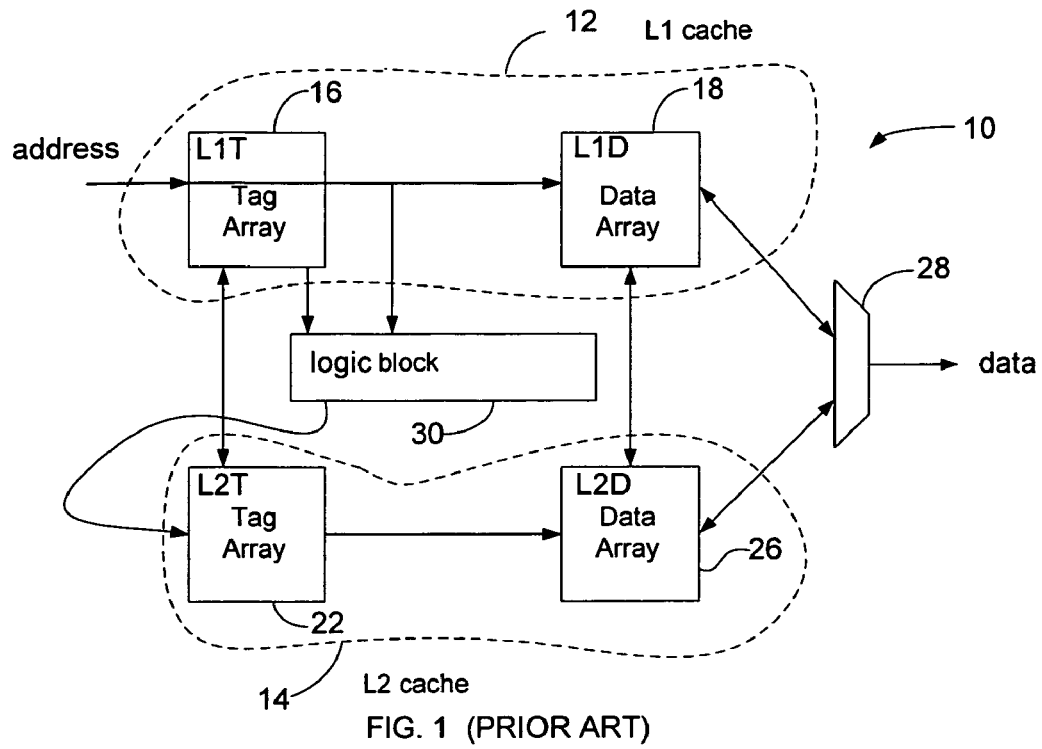
FIG. 1 is a diagram of a cache hierarchy of the prior art.

A cache hierarchy of the prior art is indicated generally by reference number 10 in FIG. 1. The cache hierarchy 10 is used by a processor (not shown) in a processing system and includes a first-level (L1) cache 12 and a second-level (L2) cache 14. The L1 cache 12 has a tag array 16 mapped to a data array 18. That is, tag entries of the tag array 16 point to data storage lines in the data array 18 in which lines of data from a main memory (not shown) are stored when requested by the processor. Like the L1 cache 12, the L2 cache 14 has a tag array 22 mapped to a data array 26. The first-level cache 12 typically is smaller and faster than the second-level cache 14.

In operation, when the processor requests a line of data from the main memory, the memory address for the requested line is sent first to the L1 cache. The L1 tag array 16 is searched to determine whether the line is stored in the L1 data array 18. If a cache "hit" occurs, i.e. the line of data is located in the L1 data array 18, the requested data is selected and sent to the processor from the L1 data array 18 via a multiplexer 28. If no pointer to the line is found in the L1 tag array 14, the line address and search results are examined in a logic block 30, for example, in a cache controller (not shown), and passed to the L2 tag array 22.

The L2 tag array 22 then is searched to determine whether the line is stored in the L2 data array 26. If a cache "hit" occurs, i.e. the line of data is located in the L2 data array 26, the requested data is selected and sent to the processor from the L2 data array 26 via the multiplexer 28. If a cache "miss" occurs, i.e. no L2 tag pointer is found, the line is fetched from the main memory and moved into the L2 and L1 caches. That is, the line is written into both data arrays 18 and 26, and each tag array 14 and 16 is updated to point to the line in the data arrays 18 and 26 respectively. It can be seen from the foregoing example that cache latency, i.e. time needed to retrieve a line from cache, increases as higher levels of cache are searched to locate a data line. Total cache latency is either the latency of the first level, or the combined latencies of the first and second levels.

Figure 2:
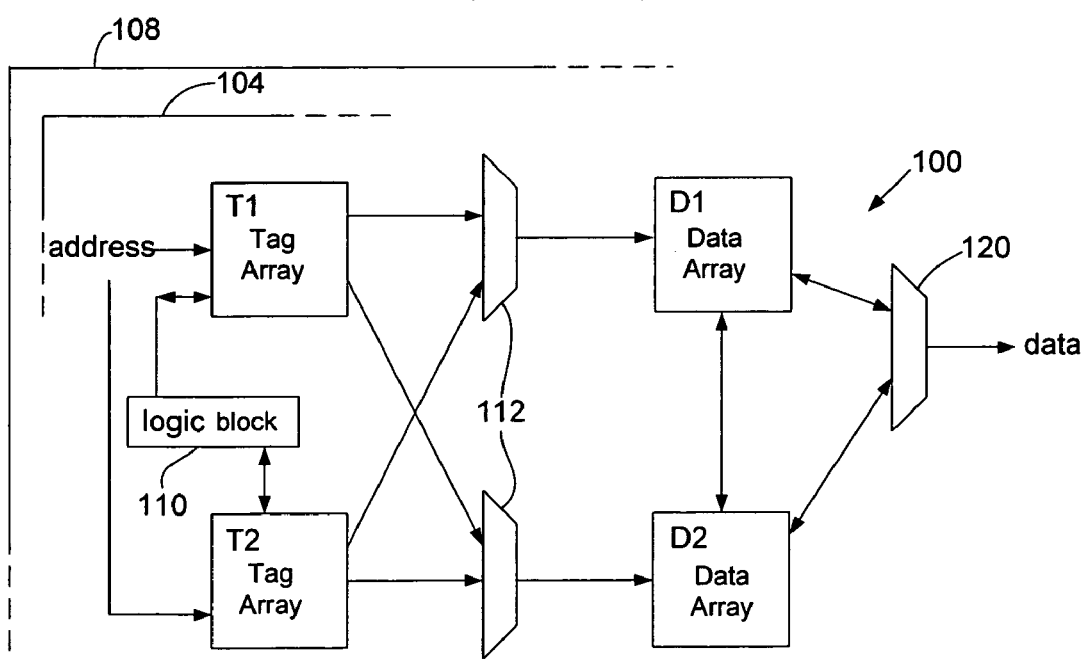
FIG. 2 is a diagram of a cache structure according to one embodiment of the present invention.

A cache structure according to one embodiment of the present invention is indicated generally by reference number 100 in FIG. 2. The cache structure 100 is used by a processor 104 in a processing system 108. The structure 100 holds lines of data requested by the processor 104 from a memory (not shown in FIG. 2) in the processing system 108. The cache structure includes two tag arrays T1 and T2 and two data arrays D1 and D2. In the present illustrative embodiment and as further discussed below, the tag array T1 and data array D1 have shorter access times than those of the arrays T2 and D2. Arrays are contemplated, however, that have different relative speeds, and embodiments are possible wherein, for example, the array D2 is faster than the array D1.

It also is contemplated that other embodiments could include more than two tag arrays and/or more than two data arrays. Additionally, although the present invention is described herein with reference to two- and four-way set-associative mappings, the invention is not so limited. Embodiments of the invention can be practiced using other levels of set associativity and also in connection with other forms of cache mapping, including but not limited to direct and associative cache mapping.

The tag array T1 is configured to point to lines of data held in data storage lines (not shown in FIG. 2) of data arrays D1 and/or D2. The tag array T2 also is configured to point to lines of data stored in data arrays D1 and/or D2. When the processor 104 requests a line of data from the memory, a memory address for the line of data is sent to the tag arrays T1 and T2. The tag arrays T1 and T2 are searched in parallel for a tag array element (not shown in FIG. 2) pointing to a data storage line, in one of data arrays D1 or D2, that holds the requested line of data. As further described below, search results are analyzed in a logic block 110, for example, a cache controller integral to or separate from the processor 104.

As shall be described in greater detail below, if a hit occurs in either tag array T1 or T2, the line address is sent, via one of two multiplexers 112, to the data array D1 or D2 pointed to by the tag array tag entry for which the hit occurred. The line address is used to locate the line of data in the data array D1 or D2 that holds the line of data. The line of data is sent from the data array D1 or D2 via a multiplexer 120 to the requesting processor 104.

Figure 3:
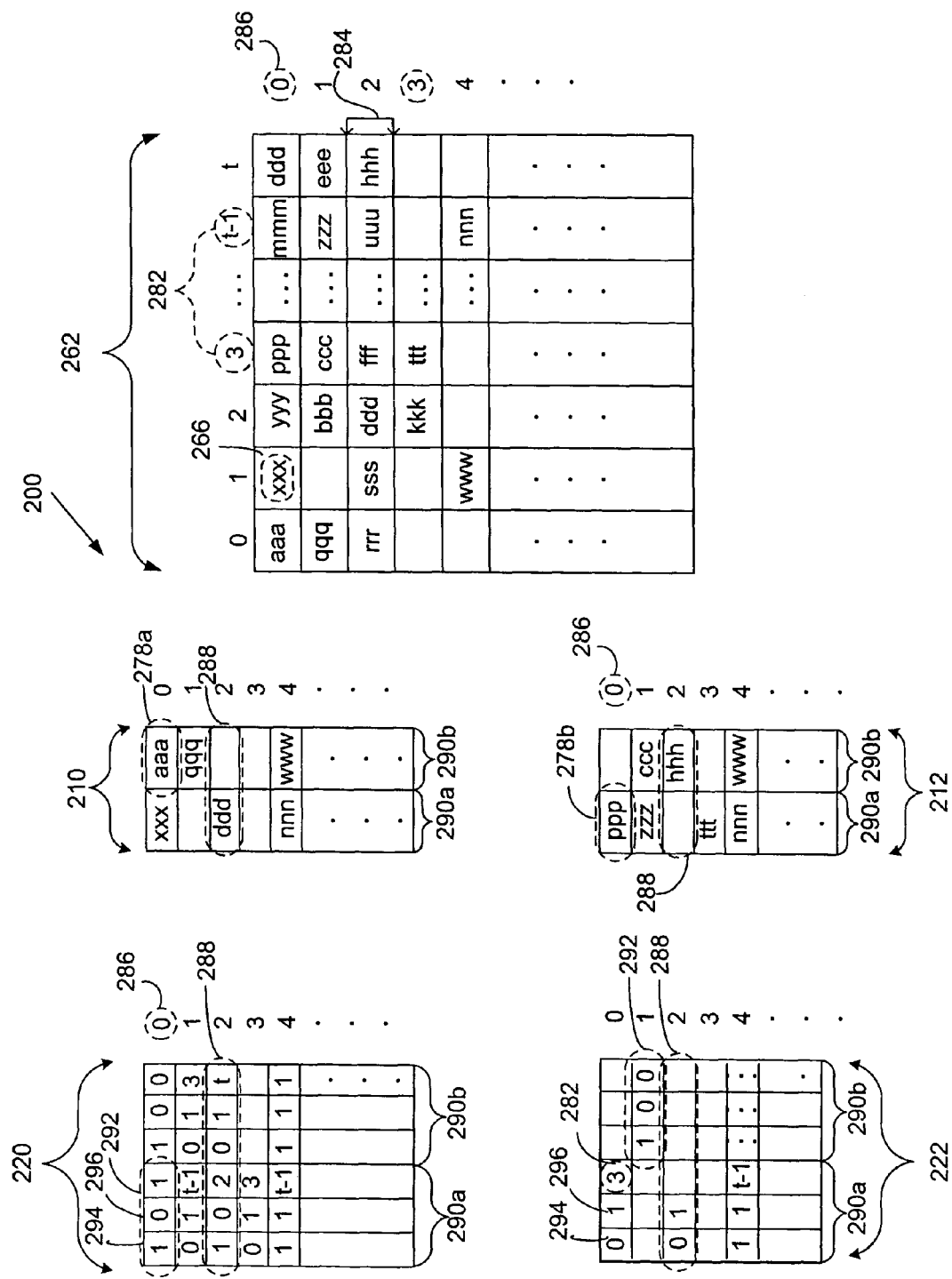
FIG. 3 is a diagram of a mapping of two tag arrays and two data arrays relative to a memory according to one embodiment of the present invention.

An embodiment of a mapping of tag arrays relative to data arrays is indicated generally by reference number 200 in FIG. 3. Two data arrays 210 and 212 can hold lines of data 266 from the memory 262 in data storage lines 278a in two "ways" 290a and 290b. A tag array 220 is mapped two-way-set-associatively to the data arrays 210 and 212. A tag array 222 also is mapped two-way-set-associatively to the data arrays 210 and 212. Each of a plurality of sets 288 in each array 210, 212, 220 and 222 is associated with a corresponding one of a plurality of groups 284 of memory 262 addresses. A line of data 266 requested by the processor 104 is written into at least one of the ways 290 in a set 288 corresponding to the group 284 from which the line of data was written. As is known in the art, the lines of data 266 are equal in length to data storage lines 278 in the cache data arrays 210 and 212.

As shown in FIG. 3 and as known in the art, a predetermined number of high-order bits of each address for data in the memory 262 is used as a tag reference 282. Additionally, a predetermined number of lower-order bits of each address for data in the memory 262 is used as a group identifier 286. Although not shown in FIG. 3, the lowest-order bits of each memory 262 address can be used to refer to individual bytes of a stored line of data. When a line 266 is written from the memory 262 into one of the data arrays 210 and 212, the tag reference 282 for the line 266 also is written into a tag array element 292 of one of the tag arrays 220 and 222.

Each tag element 292 includes a plurality of data array bits, e.g., a "D1" bit 294 and a "D2" bit 296. Bit 294 indicates whether a given data line is held in data array 210, and bit 296 indicates whether a given data line is held in data array 212. The tag reference 282 and bits 294 and 296 in the tag element 292, together with the particular way 290 in which the tag element 292 is located in a given tag array, point to the written line 266 in the data array 210 and/or 212.

As used herein, the term "element" is defined as a location (which may or may not be occupied by valid data) within an array. Each element 292 of the tag arrays 220 and 222 can include additional information not shown in FIG. 3, for example, a "valid" bit indicating whether or not the tag element 292 contains valid data. Although not shown in FIG. 3, tag array elements 292 may also hold additional information pertinent to cache coherency. Such information can include status bits such as "dirty" bits and "exclusive/shared" bits as known in the art.

As previously described, each line address in the memory 262 includes a tag reference 282 and a group reference 286. When the processor 104 requests data from an address in the memory 262, the elements 292 of both tag array sets 288 corresponding to the group reference 286 for the requested address are searched in parallel for the tag reference 282 for the requested address. If a cache miss occurs, the requested data line is retrieved from the memory 262 and stored in one or both of the data arrays 210 and 212 as shall be described in greater detail below. If a cache hit occurs, the requested line of data 266 is retrieved from the cache data array 210 or 212 pointed to by the tag array element 292 for which the hit occurred. As discussed below, a data line 266 can be held in both data arrays 210 and 212 and pointed to by tag arrays 220 and 222. Coherency can be controlled, for example, using known coherency control methods adapted and configured in the logic block 110 (shown in FIG. 2).

Embodiments of the present invention are contemplated wherein tag and/or data arrays are of different sizes. For example, a cache structure according to another embodiment is indicated generally by reference number 300 in FIG. 4. The cache structure 300 includes data arrays 310 and 312 and tag arrays 320 and 322. The arrays 320, 310, 322 and 312 function as a four-way cache structure having "ways" 330. As used herein, "way" means a way in which a line of data may be stored in a given set of a given array. Although in the embodiment under discussion the arrays 320, 310, 322 and 312 each have four "ways" 330, embodiments are contemplated wherein a number of ways can be less than or greater than four.

Tag and data arrays 322 and 312 are larger respectively than arrays 320 and 310. In the exemplary embodiment shown in FIG. 4, the arrays 322 and 312 are four times as large respectively as the arrays 320 and 310. Each set 340 of the arrays 310, 320, and 322 is associated with a corresponding group of memory addresses in a memory (not shown) and is referred to using a set reference 344.

Each "way" 330 of the tag array 322 has four times as many tag elements 332 as the tag array 310, and each "way" 330 of the data array 312 has four times as many data storage lines 336 as the data array 310. For ease of explanation, it shall be assumed in the following description of an exemplary embodiment that a tag element 332 holds only a tag reference, and any other information (such as status bits) that might be present in a tag element 332 shall be ignored. Generally, it should be appreciated that memory and array structures and sizes and addresses depicted herein are exemplary, and that memory, cache arrays and addressing can be configured in a variety of ways according to various embodiments.

Figure 5:
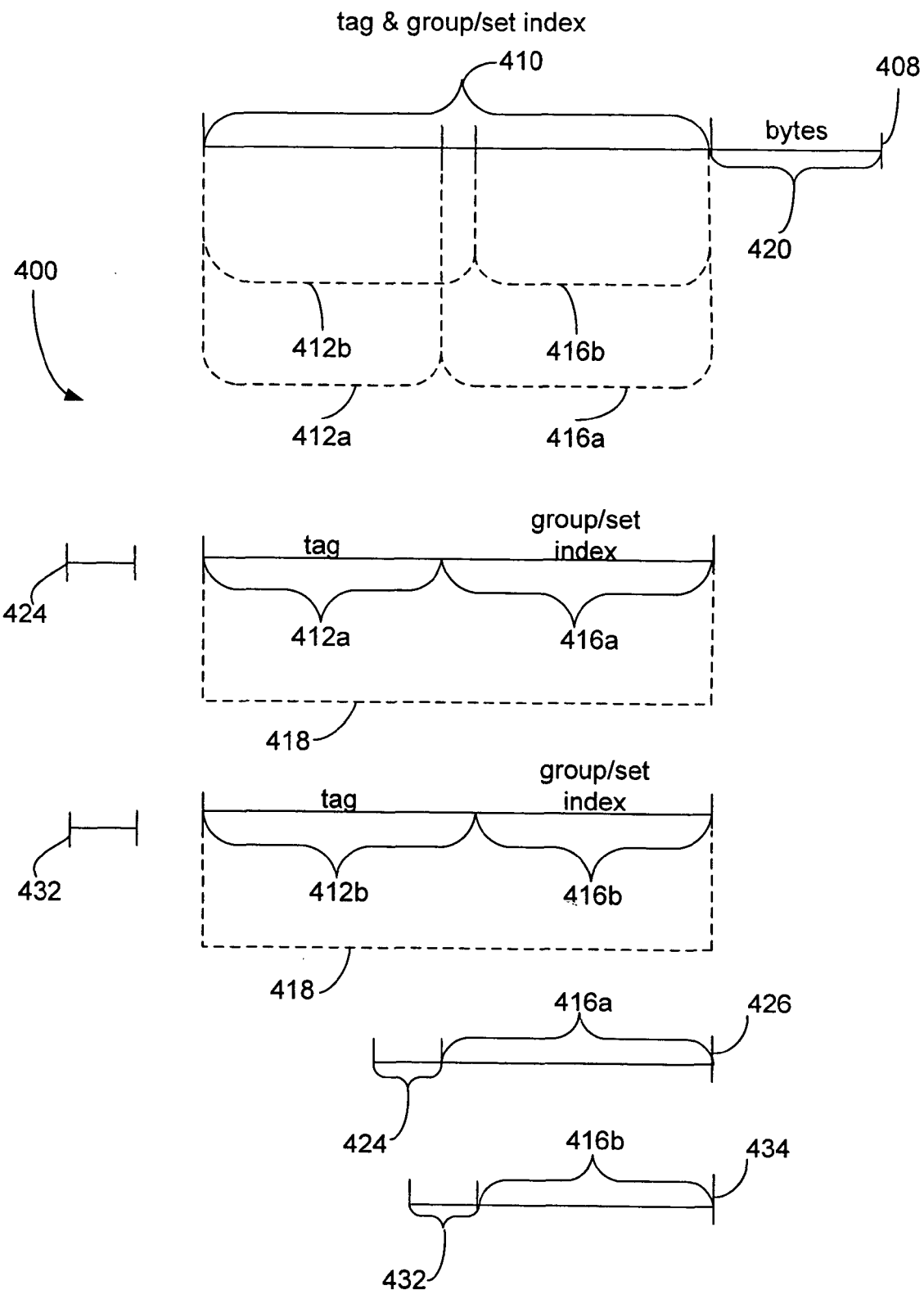
FIG. 5 is a diagram of an embodiment of an addressing scheme for accessing a cache structure.

An embodiment of an addressing scheme for accessing the cache structure 300 is referred to generally by reference number 400 in FIG. 5. As previously described with reference to FIG. 3, a memory line address 408 includes a tag- and group/set-reference portion 410 and a byte reference portion 420. It is assumed in the following example that the reference portion 410 is 32 bits in length. It also is assumed that the data array 310 is a 4K array and that the data array 312 is a 16K array. The memory address 408 can be used to access arrays of the cache structure 300 as follows.

Figure 4:
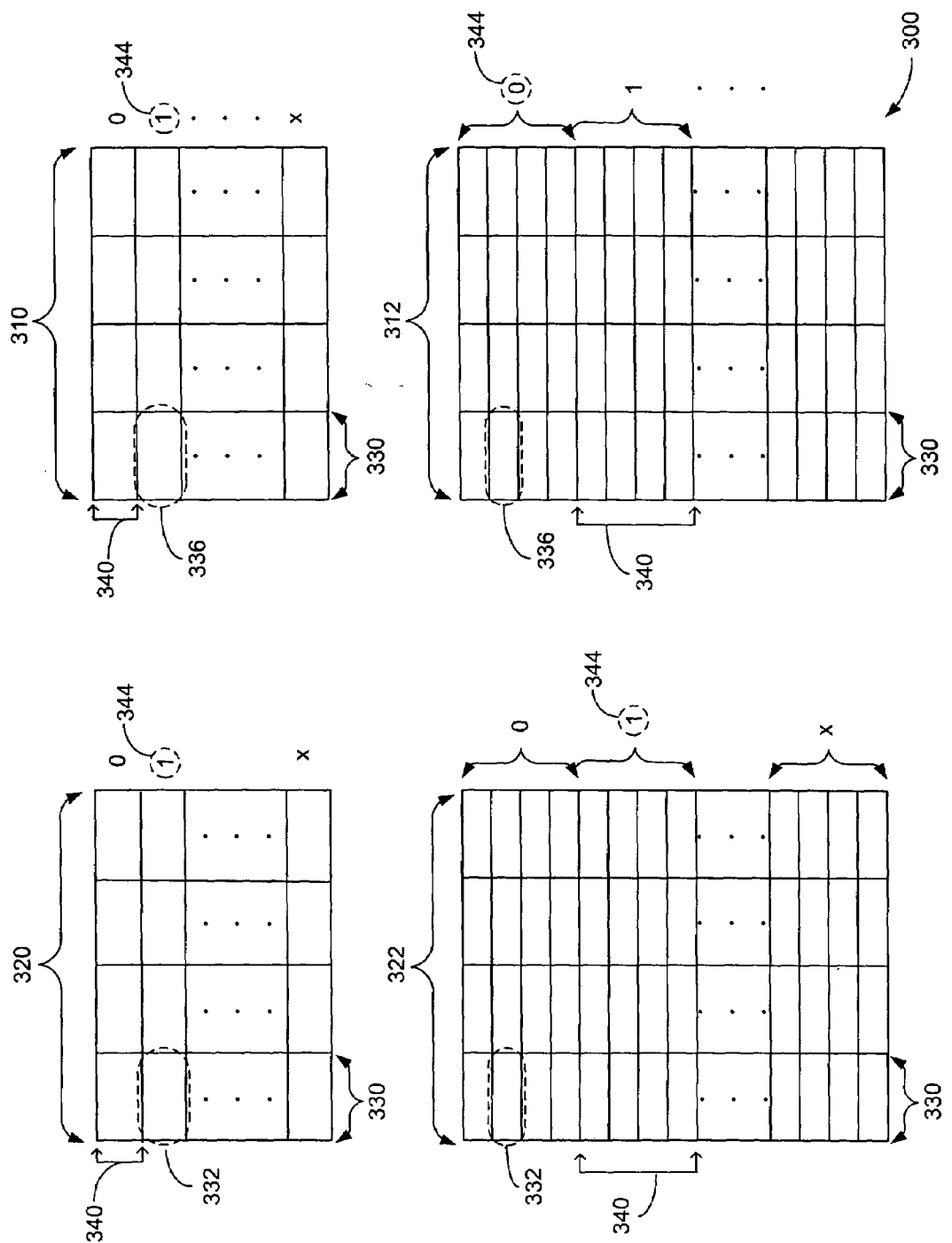
FIG. 4 is a diagram of an embodiment of a cache structure.

Referring to FIGS. 4 and 5, a number of reference bits 410 of the address 408, e.g., the most significant ten bits 412a of bits 410, are used for setting ten tag bits 412a in a 32-bit address 418 for addressing the tag array 320. A number of reference bits 410 from the address 408, e.g., the least significant twenty-two bits 416a of the bits 410, are used to set twenty-two "group/set" index bits 416a in the 32-bit address 418.

The index bits 416a address a set 340 of the tag array 320. The tag bits 412a are compared against the tag elements 332 of the set 340 located in tag array 320. If a hit occurs in tag array 320, a vector for the "way" 330 for the hit is encoded, for example, as one of four possible bit combinations of two bits 424. The combination of the "group/set" index bits 416a and "way" bits 424 are used as an index 426 for accessing a corresponding data line location in the data array 310.

To access the tag array 322, a number of reference bits 410 of the address 408, e.g., the most significant twelve bits 412b of bits 410, are used to set twelve tag bits 412b in a 32-bit address 428 for addressing the tag array 322. A number of the reference bits 410 of the address 408, e.g., the least significant twenty bits 416b, are used to set twenty "group/set" index bits 416b in the 32-bit address 428. It can be appreciated by those skilled in the art that tag bits 412b include two more bits than tag bits 412a, because the tag array 322 and data array 312 are four times larger than tag array 320 and data array 310. Although the tag bits 412a have two bits fewer than the tag bits 412b, the number of bits 412a are adequate to identify a tag element 366 in the tag and data arrays 322 and 312.

Each tag element 332 in each "way" 330 of the set 340 indicated by index bits 416b is searched for the tag reference 412b. In the present example, each set 340 in tag array 322 includes sixteen tag elements 332, and each tag element 332 in the indicated set 340 is searched until a hit occurs or until the search is completed. If a hit occurs in tag array 322, the "way" 330 for the hit is encoded, for example, as two bits 432. The combination of the "group/set" index bits 416b and "way" bits 432 is used as an index 434 for accessing a corresponding data line location in the data array 312.

In the present exemplary embodiment, when a data line is allocated in the data array 312, the addressing set 428 is used, regardless of which tag array (320 and/or 322) is used to point to the line.

In one embodiment, tag arrays 320 and 322 both are configured to hold the same number of tag reference bits 412. For example, the tag arrays 320 and 322 could each hold twelve tag bits 412, even though the tag array 322 might use only ten of the tag reference bits 412 in addressing the data array 312. When a hit occurs in the tag array 322 indicating that the requested line is being held in the data array 310, ten of the twelve tag reference bits 412 set for the tag array 322 are compared, since the two least significant bits of the twelve bits 412 are not used for addressing the data array 310.

The foregoing embodiments are exemplary, and it can be seen that many ways of structuring, addressing and searching tag and data arrays are possible in accordance with embodiments of the present invention. For example, in yet another embodiment, and referring to FIG. 2, the processing system 108 is configured such that the tag array T1 "owns" the data array D1. That is, when the tag array T1 allocates a line in the data array D1, it does not "snoop" tag array T2 to check if the array T2 is allocating a line in array D1. Similarly, tag array T2 "owns" data array D2. If a line is to be allocated, for example, in the arrays T1 and D2, when access is granted to the array T1 to allocate the line in D2, a tag is marked in the array T2 to indicate that a line is being mapped by array T1. Thus collisions can be avoided when new lines are allocated. In still another embodiment, the arrays T1 and T2 do not "own" either array by default, and query each other each time a line is allocated. In the foregoing and other embodiments, techniques well known in the art can be used for maintaining cache coherency. It can be appreciated that replacement and other algorithms can be adapted to enhance performance of the system 108. In yet another embodiment, elements of each tag array do not include bits for indicating whether another tag array also points to a given line, and cache coherency methods are adapted and used to resolve "ownership" issues.

Referring again to the embodiment shown in FIG. 2, a search of data array D1 and/or data array D2 is performed in series with the searching of tag arrays T1 and/or T2. Such a search thus can generate one of a plurality of possible latencies. Where, for example, each array is associated with a search latency as follows:
T1: 1 cycle,
D1: 1 cycle,
T2: 2 cycles,
D2: 4 cycles,
a search of the cache structure 100 could generate one of a plurality of possible latencies, including the following latencies:
T1/D1: 2 cycles,
T2/D1: 3 cycles,
T1/D2: 5 cycles,
T2/D2: 6 cycles.

As previously described, each of the tag arrays T1 and T2 can point to cache lines stored in data arrays D1 and/or D2. It is to be noted that, when a line is to be stored in cache, a tag element can be selected for the line in arrays T1 and/or T2 using heuristics different from heuristics for selecting a data storage line in arrays D1 and/or D2. Such heuristics could be based, for example, on patterns of data usage.

Logic controlling tag and data storage line allocation for a given line of data can be based on heuristics controllable by hardware and/or software settings. Such heuristics could be used, for example, to allocate the most commonly referenced data to tag and data storage lines configured to generate the lowest latencies and to allocate the least often referenced data to tag and data storage lines configured to generate the highest latencies.

Another possible heuristic for allocating cache lines could include consideration of the sensitivity of processor performance to latency. For example, it is well understood that processor performance is typically less sensitive to the latency of floating point loads and stores than it is to the latency of integer loads and stores. In such a case, and referring to the embodiment shown in FIG. 2, a cache line allocation heuristic could preferentially put floating point data into the relatively slower arrays T2 and D2, in order to save the faster data array D1 for use in operations which could gain relatively more benefit from data stored in the D1 array. It also is to be noted generally that cache tag storage typically is smaller than data storage. Thus, in one embodiment, the tag array T2 can be sufficiently large to map the combined space of both D1 and D2 data arrays. Such a mapping can reduce the probability of an eviction from the T2 tag array.

Movement of lines into and out of the cache structure 100 could occur in a plurality of ways, as can be seen from the following examples.

EXAMPLE 1

1) A cache miss occurs on a request for a data line from the cache structure 100.
2) The requested cache line is to be brought from memory into both data arrays D1 and D2, and tag elements pointing to the two copies of the line are to be stored in tag arrays T1 and T2.
3) To make room for the requested line, previously stored lines and tag elements pointing to the previously stored lines in the four arrays could be displaced as follows:
a) An element in tag array T1, and a line held in data array D1 pointed to by the T1 element, as well as an element in tag array T2 and a line held in data array D2 pointed to by the T2 element, could be replaced; or
b) an element in tag array T1, and a line held in data array D2 pointed to by the T1 element, as well as an element in tag array T2 and a line held in data array D1 pointed to by the T2 element, could be replaced.

EXAMPLE 2

1) A cache miss occurs on a request for a data line from the cache structure 100.

2) The requested cache line is to be brought from memory into data array D2, and a tag element pointing to the line in D2 is to be stored in tag array T2.

3) To make room for the requested line, a previously stored line and tag element could be displaced as follows:

a) A tag element in tag array T1, and a line held in data array D2 pointed to by the T1 element, could be replaced; or b) a tag element in tag array T2, and a line held in data array D2 pointed to by the T2 element, could be replaced.

Similar line replacements could be made where a requested line is to be brought, for example, into T1 and D2, or into T2 and D1.

EXAMPLE 3

If a requested line misses in tag array T1 but hits in tag array T2, a plurality of possible choices include the following:

a) If the requested line is already in data array D1, the requested line is left in D1 and is returned to the processor 104.

b) If the requested line is in data array D2, the requested line is left in D2 and is returned to the requesting processor 104.

c) If the requested line is in data array D2, the requested line is returned to the requesting processor 104 but also is moved to D1. The tag array T1 is not changed.

d) If the requested line is in data array D2, the requested line is returned to the processor 104 but also is moved to data array D1, and a tag element is written to tag array T1 to point to the requested line in both arrays D1 and D2.

e) If the requested line is in data array D2, the line is returned to the processor 104 and is left in D2, but a tag element is written to tag array T1 to point to the requested line in array D2.

Additional complexity can arise when lines are modified in the cache structure 100 by the processor 104, particularly where tag array T2 can point to lines which are also pointed to in tag array T1. Complexity also arises where data array D2 holds lines which are also held in data array D1. Generally, if a cache line is modified by a processor store operation, then any other copy of the line is modified, or appears to be modified, such that a subsequent load of the cache line by the processor 104 (or by another processor in the processing system 108) will see only the modified data. Coherency in the cache structure 100 can be achieved using cache coherency techniques known in the art. Such techniques include use of write-through cache and back-snooping cache, and manipulation of MESI (Modified, Exclusive, Shared, and Invalid) tag status bits.

As previously stated, embodiments of the present invention can be practiced using more than two tag arrays and more than two data arrays. Thus more than four different cache latencies are possible, where each tag array and data array has an individual latency as described above. Lower and more granular cache latencies can be provided in the foregoing cache structure than in a conventional cache hierarchical structure. Thus opportunity is increased for optimizing processor and processing system performance.

The cache structure 100 provides four levels of latency using the same hardware components that provide only two levels of latency in a conventional cache hierarchy. This additional granularity of latency provides opportunity for optimizing system performance and application performance. Additionally, because tag arrays in the cache structure 100 are searched in parallel, latency is lower than in a traditional hierarchical cache in which cache levels are searched in series. Thus even the highest latency for the cache structure 100 is lower compared to latencies of a traditional two-level cache.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cache structure for use by a processor, the structure comprising a plurality of tag arrays and a plurality of data arrays, the tag arrays each configured to point to lines of data in multiple ones of the plurality of data arrays, wherein multiple tag arrays are searched in parallel for data that may be contained in the data arrays.

2. The cache structure of claim 1 wherein one of the tag arrays comprises a size different from a size of another of the tag arrays.

3. The cache structure of claim 1 wherein one of the data arrays comprises a size different from a size of another of the data arrays.

4. The cache structure of claim 1 wherein a data storage line is allocated in one of the data arrays based on a heuristic controllable by at least one of hardware and software.

5. A method of accessing a predetermined line of data in a cache structure having a plurality of data arrays and a plurality of tag arrays each configured to point to lines of data in multiple ones of the data arrays, the method comprising:

using at least one tag reference to search the tag arrays in parallel for a group/set index for the predetermined line of data; and when a hit occurs, using the group/set index and a way for the hit as an index into one of the data arrays.

6. The method of claim 5 further comprising using a data array bit to select the one of the data arrays.

7. The method of claim 5 wherein using at least one tag reference comprises:

using a first number of bits of a tag reference to search a first tag array; and using a second number of bits of the tag reference to search a second tag array;

wherein the first number is different from the second number.

8. The method of claim 7 wherein using the group/set index and a way for the hit as an index into one of the data arrays comprises one of:

using a first number of bits of the group/set index to access a first data array; and using a second number of bits of the group/set index to access a second data array;

wherein the first number is different from the second number.

9. The method of claim 5 further comprising storing the predetermined line of data in one of the data arrays based on at least one of latencies of the data arrays and latencies of the tag arrays.

10. The method of claim 5 wherein searching the tag arrays in parallel comprises sending an address for the predetermined line of data in parallel to the tag arrays.

11. A processing system comprising a processor and a cache structure for holding lines of data requested by the processor, the cache structure comprising a plurality of tag arrays and a plurality of data arrays, each of the tag arrays configured to point to lines of data in multiple ones of the data arrays, wherein the plurality of tag arrays are searched in parallel.

12. The processing system of claim 11 further configured to allocate a data array data storage line based on processor performance sensitivity to cache latency.

13. The processing system of claim 11 wherein a tag array and data array generating a longer cache latency relative to other tag and data arrays of the cache structure are used to hold floating point data.

14. The processing system of claim 11 wherein a heuristic for allocating a data storage line is different from a heuristic for allocating a tag to point to the data storage line being allocated.

15. An apparatus for accessing a predetermined line of data in a cache structure having a plurality of data arrays and a plurality of tag arrays each configured to point to lines of data in multiple ones of the data arrays, the apparatus comprising:

means for using at least one tag reference to search the tag arrays in parallel for a group/set index for the predetermined line of data; and when a hit occurs, means for using the group/set index and a way for the hit as an index into one of the data arrays.

16. A machine-readable medium or media having recorded thereon instructions interpretable by a processor, said instructions configured to instruct the processor to use a cache structure having a plurality of data arrays and a plurality of tag arrays configured to point to lines of data in a plurality of the data arrays by searching the tag arrays in parallel for data that may be contained in the data arrays.

* * * * *